(12) United States Patent
Hari et al.

(10) Patent No.: US 9,450,487 B2
(45) Date of Patent: Sep. 20, 2016

(54) DC TO DC CONVERTER

(71) Applicant: Texas Instruments Incorporated, Dallas, TX (US)

(72) Inventors: Ajay Karthik Hari, Scottsdale, AZ (US); Takayasu Sato, Cupertino, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/303,417

(22) Filed: Jun. 12, 2014

(65) Prior Publication Data

US 2015/0022172 A1    Jan. 22, 2015

Related U.S. Application Data

(60) Provisional application No. 61/847,348, filed on Jul. 17, 2013.

(51) Int. Cl.
*G05F 1/40* (2006.01)
*H02M 3/156* (2006.01)
*H02M 1/00* (2006.01)

(52) U.S. Cl.
CPC ..... *H02M 3/156* (2013.01); *H02M 2001/0025* (2013.01)

(58) Field of Classification Search
CPC ................... H02M 3/156; H02M 2001/0022; H02M 2001/0025
USPC ...... 323/206, 207, 222, 299; 363/17, 20, 25, 363/21.04, 40, 71, 80, 89
See application file for complete search history.

(56) References Cited

U.S. PATENT DOCUMENTS

| | | | | |
|---|---|---|---|---|
| 4,837,495 A * | 6/1989 | Zansky | ................. | H02M 3/156 323/222 |
| 6,611,131 B2 * | 8/2003 | Edwards | ........... | H02M 3/33507 323/282 |
| 7,425,819 B2 * | 9/2008 | Isobe | .................... | H02M 3/156 323/222 |
| 7,605,574 B2 * | 10/2009 | Dearn | ................... | H02M 3/156 323/282 |
| 7,965,064 B2 * | 6/2011 | Morong | .................... | G05F 1/46 323/206 |
| 7,965,070 B2 * | 6/2011 | Nakahashi | ............ | H02M 3/156 323/282 |

\* cited by examiner

*Primary Examiner* — Rajnikant Patel
(74) *Attorney, Agent, or Firm* — Andrew Viger; Frank D. Cimino

(57) ABSTRACT

A DC to DC converter includes an inductor having a first terminal and a second terminal, the first terminal coupled to an input of the DC to DC converter and the second terminal being coupled to an output of the DC to DC converter. A first switch is coupled between the second terminal and a current sensor. The switch controls current flow through the inductor and generates an inductor current signal representative of the current flow through the sensor. A slope generator generates a slope compensation signal. A first mixer adds the slope compensation signal to the inductor current signal. A sample and hold circuit samples a portion of the slope compensation signal. A second mixer subtracts the sampled portion of the slope compensation signal from the output of the first mixer, wherein inductor charging is terminated in response to the output of the first mixer.

20 Claims, 4 Drawing Sheets

US 9,450,487 B2

DC TO DC CONVERTER

This patent application claims priority to U.S. provisional patent application 61/847,348, filed on Jul. 17, 2013, entitled REDUCING THE VARIATION OF INDUCTOR CURRENT LIMIT WITH DUTY CYCLE BY REMOVING SLOPE COMPENSATION IN A CURRENT MODE CONTROLLED DC-DC CONVERTER, naming Ajay K. Hari et al. as inventors, which is hereby incorporated by reference for all purposes.

BACKGROUND

Some embodiments of DC to DC converters charge an inductor for a period. The inductor is then discharged into a capacitor. Discharging the inductor into the capacitor changes the voltage across the capacitor. The capacitor voltage is the output voltage, although in some embodiments, the capacitor voltage is filtered to remove noise and the filtered voltage is the output voltage. The charging and discharging of the inductor is similar to a pulse width modulation system whereby the lengths of the charging and/or discharging determines the output voltage.

Some of the DC-DC converters use current mode control, which controls the output voltage based on the current passing through the inductor. Current mode control is susceptible to sub-harmonic oscillation for duty cycles greater than fifty percent in peak mode and duty cycles less than fifty percent in valley mode. Peak mode is where the current peaks are controlled and valley mode is where current valleys are controlled. The sub-harmonic oscillations cause noise and inaccurate DC to DC conversions.

SUMMARY

An embodiment of a DC to DC includes an inductor having a first terminal and a second terminal, the first terminal is coupled to an input of the DC to DC converter and the second terminal is coupled to an output of the DC to DC converter. A first switch is coupled between the second terminal of the inductor and a current sensor, the first switch has a closed state when current flows through the first switch and an open state when current does not flow through the first switch. The current sensor is coupled between the first switch and a node, wherein the current sensor is for generating an inductor current signal representative of the current flow through the sensor. A slope generator is for generating a slope compensation signal. A first mixer having an output adds the slope compensation signal to the inductor current signal. A sample and hold circuit samples a portion of the slope compensation signal. A second mixer having an output subtracts the sampled portion of the slope compensation signal from the output of the first mixer. The first switch is opened in response to the output of the first mixer.

DETAILED DESCRIPTION

Figure 1:
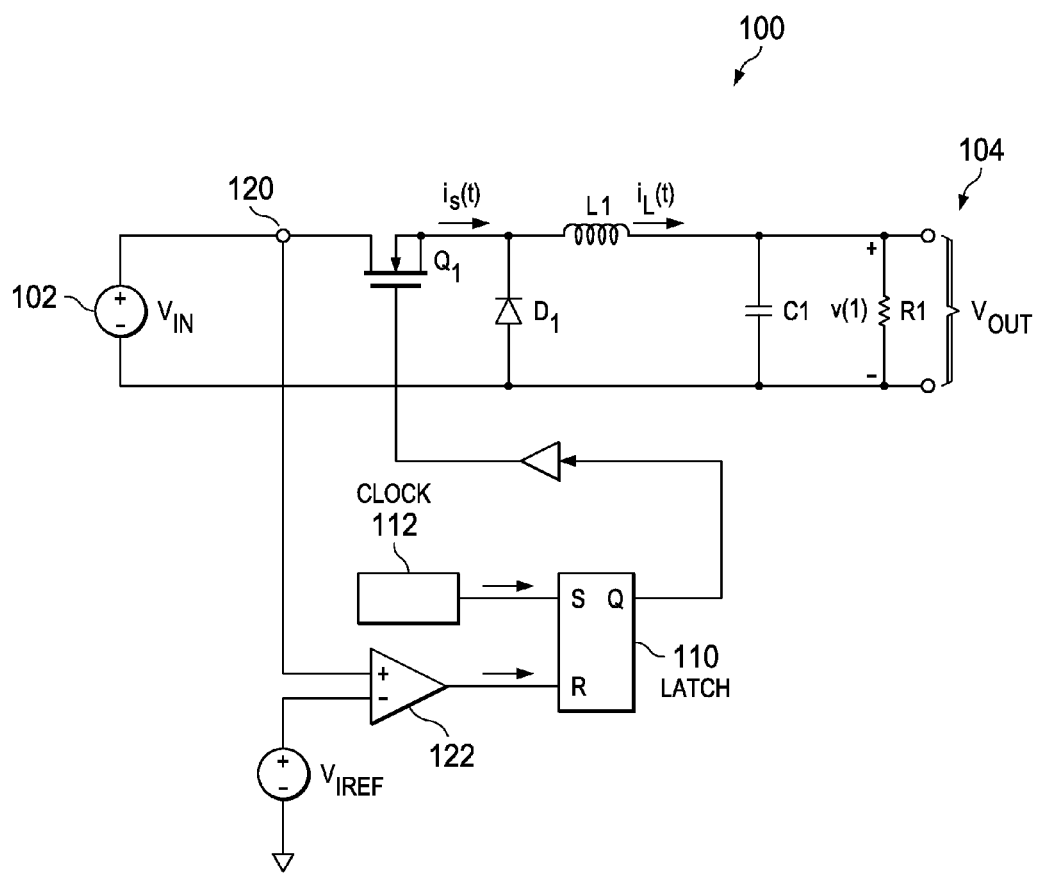
FIG. 1 is a block diagram of a prior art DC to DC converter.

Reference is made to FIG. 1, which is an embodiment of a prior art DC to DC converter 100 operating in a buck mode. The converter 100 typically includes other circuitry and devices that monitor the output voltage. The devices and methods described herein are related to current sensing, so output voltage monitoring is not described with reference to FIG. 1. The converter 100 has an input 102 where an input voltage $V_{IN}$ is applied and an output 104 where an output voltage $V_{OUT}$ is output from the converter 100. Both the input voltage $V_{IN}$ and the output voltage $V_{OUT}$ are DC voltages.

The converter 100 includes a switch, which in the embodiment of FIG. 1 is a field effect transistor (FET) Q1 that is coupled to the input 102. Source current $i_S(t)$ flows from the input 102 and through the FET Q1 depending on the gate voltage of the FET Q1. A diode D1 and an inductor L1 are coupled (e.g. connected) to the output of the FET Q1. The inductor L1 outputs a load current $I_L(t)$ to a capacitor C1 and a resistor R1. The voltage across the resistor R1 and the capacitor C1 is the output voltage $V_{OUT}$. The on-time and off-time of the FET Q1 determines the charging of the inductor L1, which determines the charging of and voltage across the capacitor C1. As described above, the voltage across the capacitor C1 is the output voltage $V_{OUT}$ of the converter 100.

The FET Q1 is controlled by a controller 110, which in the embodiment of FIG. 1 is a latch 110. The output Q of the latch 110 controls the state of the FET Q1, wherein the FET Q1 is either open or closed depending on the gate voltage of the FET Q1. An input S of the latch 110 is coupled to a clock 112. The output Q is normally equal to the input S, unless the input R is set. As described below, the input R sets when the source current $I_S(t)$ is greater than a predetermined value.

A current sensor 120 measures the source current $I_S(t)$ into the inductor L1. The current sensor 120 outputs a voltage that is input to a comparator 122. The comparator 122 compares the voltage output by the current sensor 120 to a reference voltage $V_{IREF}$. The voltage $V_{IREF}$ is representative of the maximum current that should charge the inductor L1. When the current $I_S(t)$ surpasses the current corresponding to the voltage $V_{IREF}$, the comparator 122 outputs a voltage that resets the latch 112 and opens the FET Q1, which stops the inductor L1 from charging.

The converter 100 described above directly limits the current $I_L(t)$ in the inductor L1 when the current $I_L(t)$ is at a peak or when it exceeds a value corresponding to the voltage $V_{IREF}$. For example, the current $I_L(t)$ is similar to the current $I_S(t)$ when the inductor L1 is charging. The converter 100 can be configured to limit the current $I_L(t)$ in the inductor L1 by limiting the valley current $I_L(t)$ or peak current $I_L(t)$ as described above. Based on the foregoing, the inductor valley or peak current $I_L(t)$ is limited directly, however, the average inductor current that is indirectly limited varies with the duty cycle of the current $I_L(t)$. The duty cycle is sometimes referred to as D and is the percentage of a cycle of the current $I_L(t)$ that flows through the inductor L1. This variation in average current is primarily due to variations of inductor ripple, which is referred to as sub-harmonic oscillation, and slope compensation with duty cycle.

The converter 100 is susceptible to sub-harmonic oscillation for duty cycles greater than fifty percent in peak mode and duty cycles less than fifty percent in valley mode. Peak mode is the configuration described above when the peak current in inductor L1 is limited and valley mode is when the valley current is limited. In order to attenuate the sub-harmonic oscillation, a compensating ramp, known as slope compensation, is added to the inductor current sense signal $I_s(t)$ in peak current control mode or subtracted from the current sense signal $I_s(t)$ in valley current mode control. The same current sense signal with the added compensation ramp is typically presented to a current limit comparator because it is desirable to avoid sub-harmonic oscillation in either current limit mode.

When the converter 100 is based on buck topology, the output voltage Vag is less than the input voltage $V_{IN}$. In the buck topology, the slope compensation is achieved using a slope compensating ramp function. The slope compensation is proportional to $V_{OUT}/L$ in peak control and $(V_{IN}-V_{OUT})/L$ in valley control. Depending on the input and output conditions, the magnitude of the slope compensating ramp can dwarf the inductor current sense signal $I_S(t)$, which often occurs in the case of valley mode. The converters and methods described herein provide for current limiting circuitry that is more accurate by removing the slope compensation and avoiding sub-harmonic oscillation.

Figure 2:
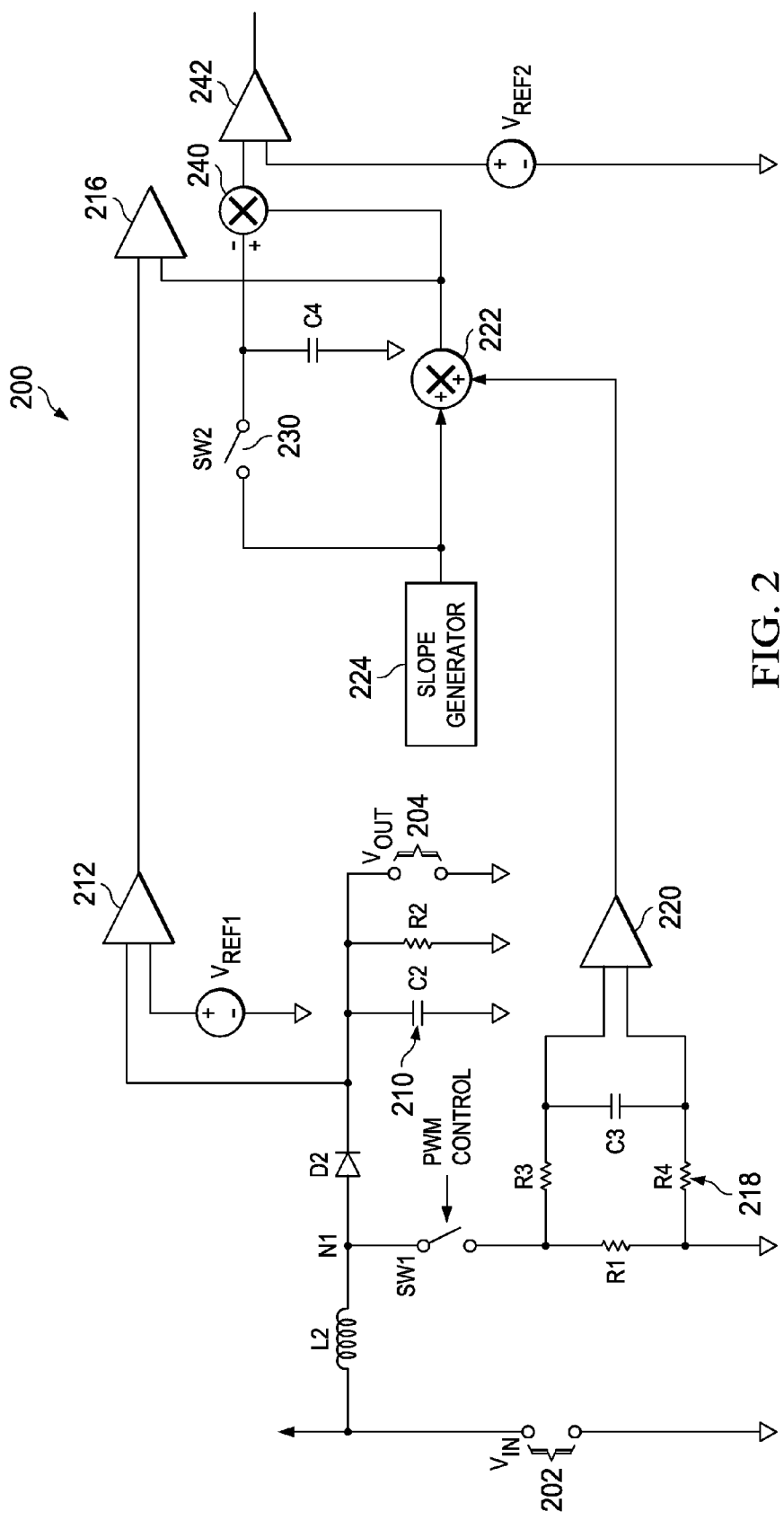
FIG. 2 is a schematic diagram of an embodiment of a DC to DC converter that overcomes the problems associated with the converter of FIG. 1.

An embodiment of a DC to DC converter 200 that overcomes the problems associated with the prior art converter 100 is shown in FIG. 2. The converter 200 includes an input 202 that receives a DC input voltage $V_{IN}$. The input voltage $V_{IN}$ is converted to an output voltage $V_{OUT}$ that is present on an output 204 of the converter 200. The converter 200 is configured as a boost converter, so the output voltage $V_{OUT}$ is greater than the input voltage $V_{IN}$. The converter 200 includes an inductor L2 that is coupled between the input 202 and a node N1. The inductor L2 is sometimes referred to as having a first terminal that is coupled to the input and a second terminal that is coupled to the node N1. The inductor L2 stores energy and discharges energy in the form of electric current.

A switch SW1 is coupled between the node N1 and a current sensing resistor R1. The state of the switch SW1 is controlled by a pulse width modulation (PWM) controller, which is not shown in FIG. 1. The switch SW1 controls the charging and discharging of the inductor L2 along with the duty cycle. A diode D2 is coupled between the node N1 and the output 204. The diode D2 prevents the inductor L2 from charging by way of voltages present on the output 204. Therefore, the inductor L2 is only able to be charged from the input voltage $V_{IN}$ at the input 202. The output 204 is coupled to a low-pass filter 210, which in the embodiment of FIG. 2 includes a capacitor C2 and a resistor R2. The low-pass filter 210 serves to attenuate ripple and transients.

The output voltage $V_{OUT}$ is monitored by an error amplifier 212 that amplifies the voltage difference between the output voltage $V_{OUT}$ and a reference voltage $V_{REF1}$. The output of the error amplifier 212 is coupled to an input of a comparator 216. As described in greater detail below, the comparator 216 compares the output of the error amplifier 212 to a voltage slope. The output of the comparator 216 is coupled to a PWM controller (not shown) that controls the state of the switch SW1 as is known in the art.

The current sensing resistor R1 is connected to a node, which in the embodiment of FIG. 2 is ground. The resistor R1 is also coupled to a filter 218 that includes resistors R3 and R4 and a capacitor C3. The resistance of the sensing resistor R1 is typically very small, so the voltage generated by the sensing resistor R1 is amplified by an amplifier 220. The output of the amplifier 220 is coupled to an input of a mixer 222. The mixer 222 has a second input that is coupled to a slope generator 224. The slope generator 224 generates a ramp function to offset or attenuate the sub-harmonic oscillations when the duty cycle exceeds fifty percent for peak monitoring or is less than fifty percent for valley monitoring. The output of the mixer 222 is coupled to the comparator 216 where it is compared to the output of the error amplifier 212 as described above.

The output of the slope generator 224 is also coupled to a sample and hold circuit 230 that includes a capacitor C4 and a switch SW2. The sample and hold circuit 230 is coupled to the input of a mixer 240 where it is subtracted from the output of the mixer 222. The waveforms associated with the mixers 222 and 240 are described in greater detail below. The output of the mixer 240 is coupled to a comparator 242 where it is compared to a predetermined voltage $V_{REF2}$. The output of the comparator 242 is a signal used to terminate the charging of the inductor L2. Accordingly, the voltage $V_{REF2}$ is a voltage that corresponds to the maximum charging current that the inductor L2 can be subjected to. For example, if the inductor L2 is charging too high, it can damage components in the converter 200 or generate an output voltage $V_{OUT}$ that is too great.

The operation of the converter 200 will now be described. In summary, a combination of inductor current sense signal and slope compensation ramp is presented to the current limit comparator 242. When this signal crosses a predetermined threshold established by the voltage reference $V_{REF2}$, a current limit event is detected and a pulse used to close the switch SW1 is immediately terminated for the rest of the cycle. Terminating the charging is accomplished by opening the switch SW1 so that the inductor L2 cannot charge any further. The converter 200 preserves the advantage of adding or deleting the slope compensation from the current sense signal using the mixer 222, which avoids sub-harmonic oscillation. The duty cycle that operates the switch SW1 has a very small change from one cycle to the next cycle, so the required slope compensation variation generated by the slope generator 224 is also very small. Accordingly, the amount of slope compensation added in a given cycle is peak detected and, using the sample and hold circuit 230, the information is stored. At the beginning of the subsequent cycle, the inductor current signal is offset by the slope compensation information stored by the sample and hold circuit 230 from the previous cycle. Slope compensation is added or subtracted to the present cycle normally. Therefore, the current sense signal output by the mixer 240 reaches the same peak as the previous cycle. This does not change the onset of the inductor current limit signal output by the comparator 242 and the presence of slope compensation will avoid sub-harmonic oscillation.

The operation of the converter 200 will now be described in greater detail. The converter 200 converts the input DC voltage $V_{IN}$ to an output DC voltage $V_{OUT}$. A PWM controller (not shown) closes the switch SW1, which cause current to flow from the input 202, through the inductor L2, and through the sensing resistor R1. After a predetermined time, the switch SW1 is opened causing the energy stored in the inductor L1 to discharge current through the diode D2 and into the capacitor C2. Because the capacitor C2 and the resistor R2 form a low-pass filter, the output voltage $V_{OUT}$ is a DC voltage.

The output voltage $V_{OUT}$ is monitored by the error amplifier 212 which amplifies the difference between the output voltage $V_{OUT}$ and the reference voltage $V_{REF1}$. The error amplifier 212 outputs a voltage that is compared to the output of the mixer 222 by the comparator 216. if the voltage is low, the PWM controller adjusts the duty cycle of the pulses operating the switch SW1 to increase the charge on the inductor L2, which charges the capacitor C2 to a higher voltage. If the voltage is high, the PWM controller adjusts the duty cycle of the pulses operating the switch SW1 to decrease the charge on the inductor L2, which charges the capacitor C2 to a lower voltage. In other embodiments, the error amplifier 212 or other circuitry monitors the output voltage $V_{OUT}$ to determine if it is within a predetermined range. The duty cycle of the pulses operating the switch SW1 is adjusted to bring the output voltage $V_{OUT}$ within the predetermined specification.

Figure 3A:
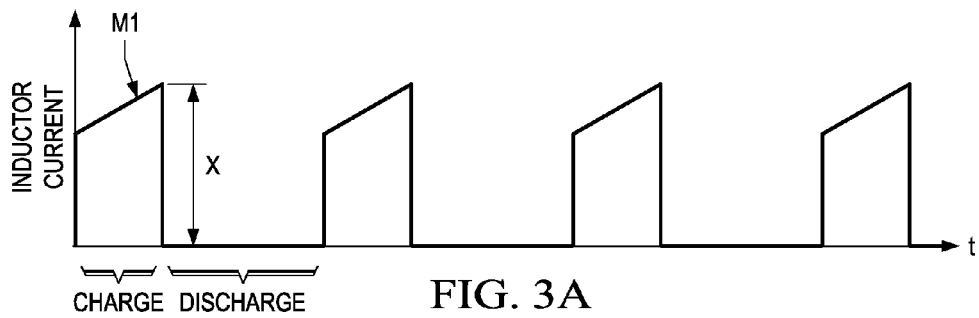
FIG. 3A is a graph depicting an embodiment of the inductor current through the inductor of FIG. 2.

The current used to charge the inductor L2 when the switch SW1 is closed is referred to as the inductor current and is sensed by the resistor R1. The value of the resistor R1 is very small so as not to interfere with the charging of the inductor L2. The voltage generated by the inductor current flowing through the resistor R1 is filtered by the filter 218 and amplified by the amplifier 220. An example of the inductor current is shown by the graph of FIG. 3A, which shows the time in which the inductor L2 is charging and discharging, wherein the charging portion has a slope m1. The duty cycle is the ratio of the time that the inductor L2 is charging divided by the time of one period of a cycle, so it is related to the percentage of a cycle that the inductor L2 is charging. The peak inductor current is referred to as X and is sometimes referred to as the peak inductor current.

Figure 3B:
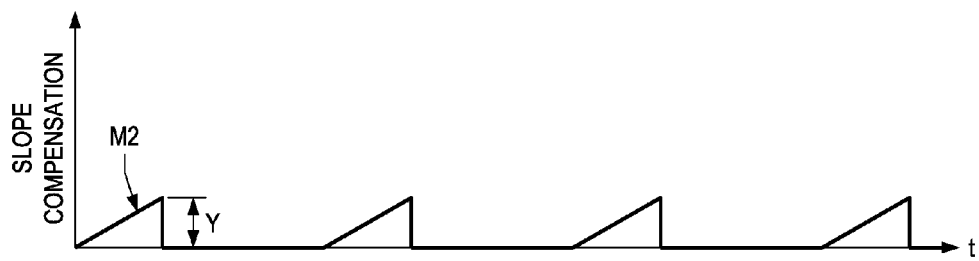
FIG. 3B is a graph depicting an embodiment of the slope compensation generated by the slope generator of FIG. 2.
Figure 3C:
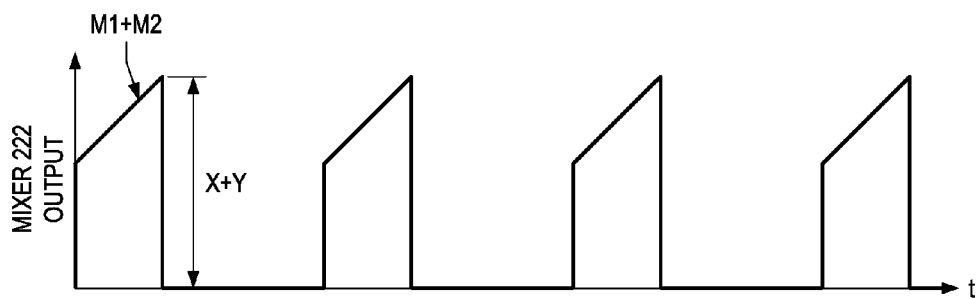
FIG. 3C is a graph depicting the summation of the inductor current of FIG. 3A and the slope compensation of FIG. 3B.

The inductor current is input to the mixer 222 where it is added to the slope compensation generated by the slope generator 224. An embodiment of the slope compensation generated by the slope generator 224 is shown in FIG. 3B. The slope compensation has a peak noted by Y, a duration that corresponds to the charge time in FIG. 3A and a slope m2. The slope compensation is also input to the sample and hold circuit 230 as described in greater detail below. The mixer 222 outputs the sum of the inductor current and the slope compensation, which is shown by the exemplary graph of FIG. 3C. As shown in FIG. 3C, the peak output by the mixer 222 is the sum of X and Y and the slope is also the sum of the slope m1 of the inductor current and the slope m2 of the slope compensation. The output of the mixer 222 is input to the comparator 216 where it is used to by the PWM controller (not shown) to control the switch SW1 in a conventional manner.

Figure 3D:
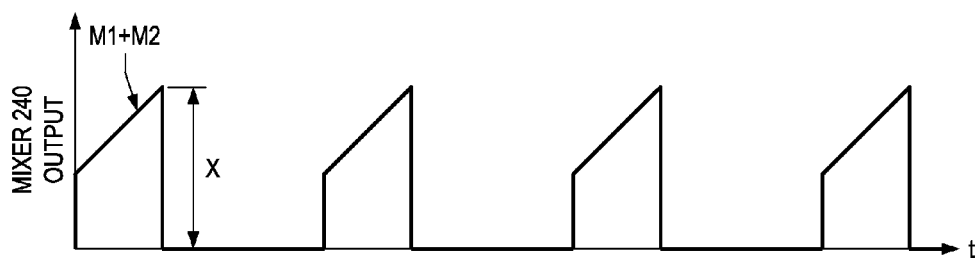
FIG. 3D is a graph depicting the subtraction of the peak slope compensation from the graph of FIG. 3C.

The output of the mixer 222 is also output to the mixer 240 where the peak of the slope compensation, FIG. 3B, is subtracted from the slope generator signal. The output of the mixer 240 is shown by the graph of FIG. 3D. During the slope generation by the slope generator 224, the switch SW2 is closed so that the capacitor C4 charges to the value of Y. After the peak has been reached, the switch SW2 is opened so that the DC voltage of amplitude Y is input to the mixer 240. The output of the mixer 240 has a peak X and a slope of m1 plus m2. The signal of FIG. 3D is input to the comparator 242 where it is compared to the reference voltage $V_{REF2}$. If the voltage output by the mixer 240 exceeds the reference voltage $V_{REF2}$, the comparator 242 outputs a signal that terminates the charging of the inductor L2. More specifically, when the comparator 242 outputs a voltage, the current limit of the inductor L2 and/or the converter 200 has been reached, so the switch SW1 is opened.

The maximum slope compensation generated by the slope generator 224 is peak detected from the previous cycle. This maximum slope compensation is offset or subtracted from the sum of the inductor current sense signal and the slope compensation by the mixer 240. Therefore, the peak reached by the input to the comparator 242 is equal to X in the given cycle but the slope will have both the inductor current slope and the slope of the slope compensation in it. In conventional converters, the signal to terminate the charging of the inductor is the sum of the inductor current and the slope compensation. In many situations, the slope compensation is a significant portion of this signal, so the current limiting signal that terminates the charging of the inductor is not accurate.

The advantages of the converter 200 over conventional converters are described below. A combination of the inductor current signal and the slope compensation ramp generated by the slope generator 224 is presented to the current limit comparator 242. When the signal crosses the predetermined threshold set by the voltage reference $V_{REF2}$, a current limit event is detected and the switch SW1 is opened in order to terminate the charging of the inductor L2 for rest of the cycle. The converter 200 preserves the advantage of adding or subtracting the slope compensation from the inductor current signal, which prevents sub-harmonic oscillation.

The duty cycle change from one cycle to the next is typically small and therefore the required slope compensation variation from one cycle to the next cycle is also small. Accordingly, the amount of slope compensation added in a given cycle is peak detected and stored using the sample and hold circuit 230. At the beginning of the subsequent cycle, the inductor current signal is offset by the slope compensation information stored from the previous cycle in the sample and hold circuit 230. The stored slope compensation is added or subtracted to the current cycle by use of the mixer 240. Therefore, the signal input to the comparator 242 signal will reach the same peak as the previous cycle. This will not modify the triggering of a signal from the comparator 242 to limit inductor current; however, the presence of the slope compensation will avoid sub-harmonic oscillation.

Figure 4:
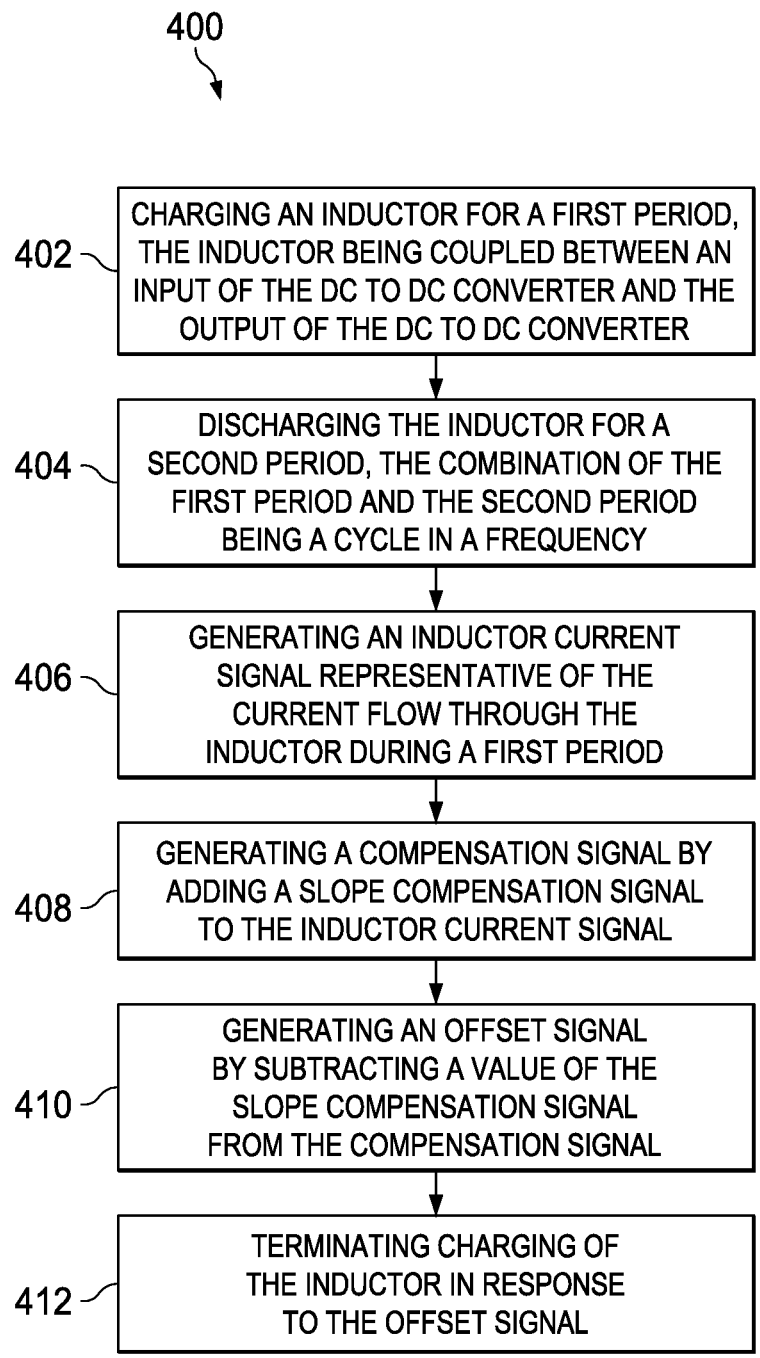
FIG. 4 is a flowchart describing the operation of the DC to DC converter of FIG. 2.

The operation of the slope compensation with the inductor current sensing is shown by the flowchart 400 of FIG. 4. The method of FIG. 4 commences at step 402 with charging an inductor for a first period, the inductor being coupled between an input of the DC to DC converter and the output of the DC to DC converter. In step 404, the inductor is discharged for a second period, the combination of the first period and the second period being a cycle in a frequency. The flowchart continues at step 406 with generating an inductor current signal representative of the current flow through the inductor during a first period. In step 408 a compensation signal is generated by adding a ramp function to the inductor current signal. In step 410 an offset signal is generated by subtracting a value of the ramp function from the compensation signal. In step 412 the charging of the inductor is terminated in response to the offset signal.

The converter 200 and the method of operating the converter 200 with regard to terminating the charging of the inductance L2 applies to buck, boost and buck-boost based DC to DC converters in peak current mode control, valley current mode control or voltage mode control with a current limit function.

Although illustrative embodiments have been shown and described by way of example, a wide range of alternative embodiments is possible within the scope of the foregoing disclosure.

What is claimed is:

1. A DC to DC converter comprising:
   an input terminal for receiving an input DC voltage;
   an output terminal for supplying an output DC voltage;
   a first inductor terminal and a second inductor terminal, the first inductor terminal coupled to the input terminal, and the second inductor terminal coupled to the output terminal;
   a first switch operative to control an inductor current flowing from the second inductor terminal to the output terminal;
   a current sensor for measuring the inductor current and generating an inductor current signal;
   a slope generator for generating a slope compensation signal;
   a first mixer having an output, the first mixer for adding the slope compensation signal to the inductor current signal;
   a sample and hold circuit for sampling a portion of the slope compensation signal; and
   a second mixer having an output, the second mixer for subtracting the sampled portion of the slope compensation signal from the output of the first mixer, the first switch at least partially controlled in response to the output of the second mixer.

2. The DC to DC converter of claim 1 further comprising a comparator having an output, the comparator for comparing the output of the second mixer to a predetermined value and wherein the first switch is switched in response to the output of the comparator.

3. The DC to DC converter of claim 1, wherein the sample and hold circuit is for sampling a peak value of the slope compensation signal.

4. The DC to DC converter of claim 1, wherein the first switch is coupled between the second inductor terminal and a ground.

5. The DC to DC converter of claim 1, wherein the first switch opens and closes per a frequency, wherein the sample and hold circuit samples a portion of the slope compensation occurring during a first period of the frequency, and wherein the second mixer mixes the sampled signal to the output of the first mixer based on a second period of the frequency.

6. The DC to DC converter of claim 5 wherein the second period of the frequency is the period directly following the first period.

7. The DC to DC converter of claim 1, wherein the first switch is a field effect transistor.

8. The DC to DC converter of claim 1, wherein:
   the inductor current signal has a first slope during a time when the inductor current is increasing;
   the slope compensation signal has a slope compensation value based on a slope compensation ramp function; and
   the output of the second mixer has a third slope that is the sum of the first slope and the slope compensation value.

9. The DC to DC converter of claim 1, wherein the peak voltage output by the second mixer has an amplitude that is substantially the same as a peak amplitude of the inductor current signal.

10. The DC to DC converter of claim 1, wherein the peak voltage output by the first mixer has an amplitude that is substantially the sum of the peak amplitude of the inductor current signal and the slope compensation signal.

11. The DC to DC converter of claim 1 further comprising:
   a second comparator for comparing the output voltage to a predetermined voltage; and
   a third comparator for comparing the output of the second comparator to the output of the first mixer;
   wherein the state of the first switch is at least partially controlled in response to the output of the third comparator.

12. The DC to DC converter of claim 1 further comprising a diode coupled between the second inductor terminal and the output terminal.

13. The DC to DC converter of claim 1 further comprising a low pass filter coupled between the output terminal and a ground potential.

14. A method of operating a DC to DC converter, the method comprising:
   charging an inductor for a first period, the inductor being coupled between an input of the DC to DC converter and an output of the DC to DC converter;
   discharging the inductor for a second period, the combination of the first period and the second period being a cycle in a frequency;
   generating an inductor current signal representative of the current flow through the inductor during a first period;
   generating a compensation signal by adding a slope compensation signal to the inductor current signal;
   generating an offset signal by subtracting a value of the amplitude of the slope compensation signal from the compensation signal; and
   terminating charging of the inductor in response to the offset signal.

15. The method of claim 14, wherein the compensation signal has a slope that is substantially equal to the sum of the inductor current signal and the slope compensation signal.

16. The method of claim 14, wherein the compensation signal has a peak amplitude that is substantially equal to the sum of the peak amplitude of the inductor current signal and the peak amplitude of the slope compensation signal.

17. The method of claim 14 further comprising storing the peak amplitude of the slope compensation signal during a first cycle and wherein generating an offset signal comprises subtracting a peak amplitude of the slope compensation signal from a subsequent cycle of the compensation signal.

18. The method of claim 14 wherein generating an offset signal further comprises generating an offset signal that has substantially the same peak amplitude as the peak amplitude of the inductor current signal.

19. The method of claim 14 further comprising comparing the offset signal to a predetermined voltage and wherein terminating charging of the inductor comprises terminating charging of the inductor in response to the offset signal being greater than the predetermined voltage.

20. A DC to DC converter comprising:
   an inductor having a first terminal and a second terminal, the first terminal coupled to an input of the DC to DC converter and the second terminal being coupled to an output of the DC to DC converter;
   a first switch coupled between the second terminal and a current sensor, the first switch having a closed state when current flows through the first switch and an open state when current does not flow through the first switch;
   the current sensor being coupled between the first switch and a ground, the current sensor for generating an inductor current signal representative of the current flow through the sensor;
   a slope generator for generating a slope compensation signal;
   a sample and hold circuit for storing the peak amplitude of the slope compensation signal during a first period;

a first mixer having an output, the first mixer for adding the slope compensation signal to the inductor current signal;

a second mixer having an output, the second mixer for subtracting the sampled portion of the slope compensation signal from the output of the first mixer during a second period, wherein the second period is subsequent to the first period; and a comparator coupled to the output of the second mixer, the comparator for comparing the output of the second mixer to a predetermined voltage;

wherein the first switch is opened in response to the output of the comparator.

* * * * *